United States Patent [19]

Kashigi

[11] 4,218,700
[45] Aug. 19, 1980

[54] LUMINANCE/CHROMINANCE SEPARATING APPARATUS HAVING A SPATIAL FILTERING EFFECT

[75] Inventor: Kazuo Kashigi, Tokyo, Japan
[73] Assignee: Nippon Electric Company, Ltd., Tokyo, Japan
[21] Appl. No.: 39,287
[22] Filed: May 15, 1979
[30] Foreign Application Priority Data
  May 17, 1978 [JP] Japan .................................. 53-59164
[51] Int. Cl.² ............................................. H04N 9/535
[52] U.S. Cl. ..................................................... 358/31
[58] Field of Search ......................................... 358/31
[56] References Cited
U.S. PATENT DOCUMENTS
4,072,984 2/1978 Kaiser ..................................... 358/31

FOREIGN PATENT DOCUMENTS
1333886 10/1973 United Kingdom ....................... 358/31

*Primary Examiner*—Richard Murray
*Attorney, Agent, or Firm*—Hopgood, Calimafde, Kalil, Blaustein & Lieberman

[57] ABSTRACT

Luminance/chrominance separating apparatus in which a luminance signal and chrominance signal are extracted from a composite color television signal by a comb filter. A low frequency signal component is extracted from the chrominance signal and passed through a variable attenuator. The low frequency signal component from the variable attenuator is added to the luminance signal to produce a compensated luminance signal.

6 Claims, 14 Drawing Figures

LUMINANCE/CHROMINANCE SEPARATING APPARATUS HAVING A SPATIAL FILTERING EFFECT

FIELD OF THE INVENTION

This invention relates to apparatus for separating luminance and carrier chrominance signals from a composite color television signal, and more particularly to a luminance/chrominance separating apparatus (Y/C separator) having a spatial filtering effect. The apparatus is applicable to a composite color television signal processing system in which the luminance signal (Y signal) and the carrier chrominance signal (C signal) are separated from the composite color television signal and then signal processing is applied individually to the Y and C signals.

DESCRIPTION OF THE PRIOR ART

This invention will hereafter be described, for illustrative purposes, in conjunction with a picture compressing system for producing a compressed television signal representative of a picture compressed to a desired size. In a conventional picture compressing system, as described in U.S. Pat. No. 4,063,280, the Y and C signals are separated from the composite color television signal and are processed independent of each other to achieve simplicity in the signal processing.

In the case where the picture is to be compressed in the vertical direction, the number of scanning lines, i.e., the number of samples in the vertical direction is reduced. This results in aliasing noise, i.e., noise due to the presence signal components higher in frequency than one half of the sampling frequency.

In order to prevent aliasing noise, a spatial filter must be inserted in the stage following the Y/C separator. However, this makes the system as a whole, more complicated.

It is, therefore, an object of this invention to provide a luminance/chrominance separating apparatus having a spatial filtering effect.

It is another object of this invention to provide a picture compressing system having a simplified structure.

SUMMARY OF THE INVENTION

According to one aspect of this invention, there is provided a luminance/chrominance separating apparatus in which a luminance signal and chrominance signal are extracted from a composite color television signal by a comb filter comprising delay means, adding means and subtracting means. A low frequency signal component is extracted from the chrominance signal and then passed through a variable attenuator. The low frequency signal component from the variable attenuator is added to the luminance signal to produce a compensated luminance signal.

According to another aspect of this invention, there is provided a picture compressing system comprising a luminance/chrominance separating apparatus in which the low frequency signal component of the chrominance signal is added to the luminance signal after the passage through the variable attenuator, the variable attenuator having a transmission factor controlled by the compression ratio for the vertical direction.

The features and advantages of this invention will be understood from the following detailed description of a preferred embodiment of this invention taken in conjunction with the accompanying drawings.

DETAILED DESCRIPTION

Figure 1:
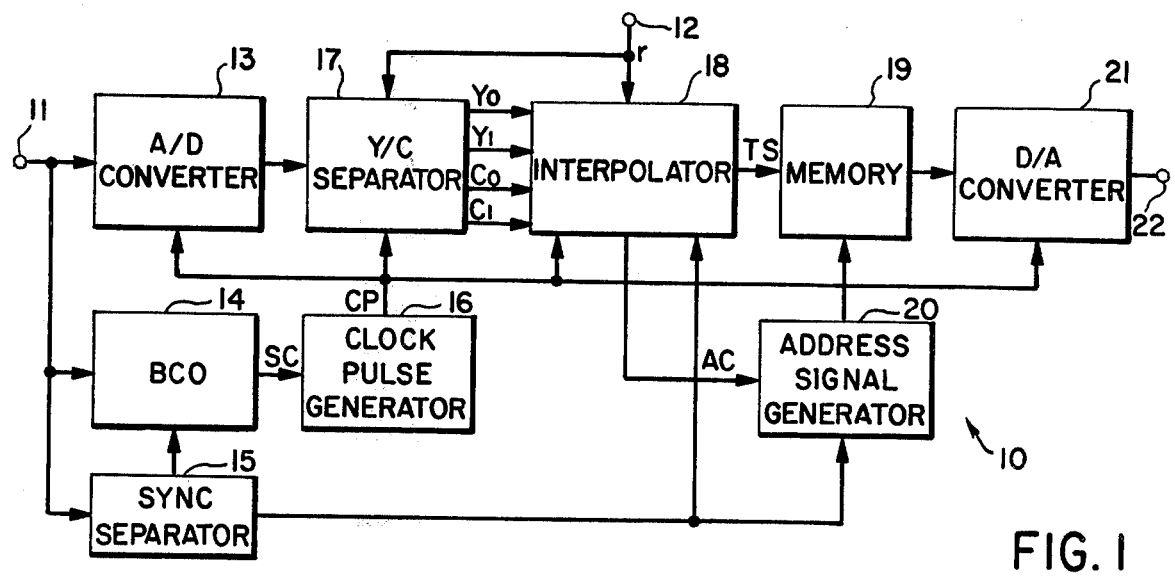
FIG. 1 is a block diagram of one embodiment of this invention.

Referring to FIG. 1, a picture compressing system 10 includes a Y/C separator embodying this invention. The system 10 is supplied, at an input terminal 11, with an input composite television signal to be compressed in accordance with a compression ratio data r ($0 \leq r \leq 1$) supplied at a terminal 12. From terminal 11, the composite color television signal is supplied to an A/D converter 13, a burst controlled oscillator (BCO) 14, and a sync separator 15. The BCO 14 is also supplied with a synchronizing signal separated at sync separator 15. The BCO 14 generates a continuous wave SC of a color subcarrier frequency (about 3.58 MHz in the case of an NTSC system) synchronized with the color burst signal contained in the input composite color television signal. The subcarrier SC, from the BCO 14, is supplied to a clock pulse generator 16 to produce a clock pulse CP of approximately 14.32 MHz (3.58 MHz×4). The clock pulse CP is supplied to the A/D converter 13, which converts the composite color television signal into an 8-bit PCM television signal having a clock frequency of 14.32 MHz.

The PCM television signal from the A/C converter 13 is then supplied to a Y/C separator 17 for separating two sets of luminance (Y) and chrominance (C) signals $Y_0$ and $C_0$, and $Y_1$ and $C_1$ with a lag of one horizontal scanning period (1H) between the two sets of signals Y and C.

Figure 2:
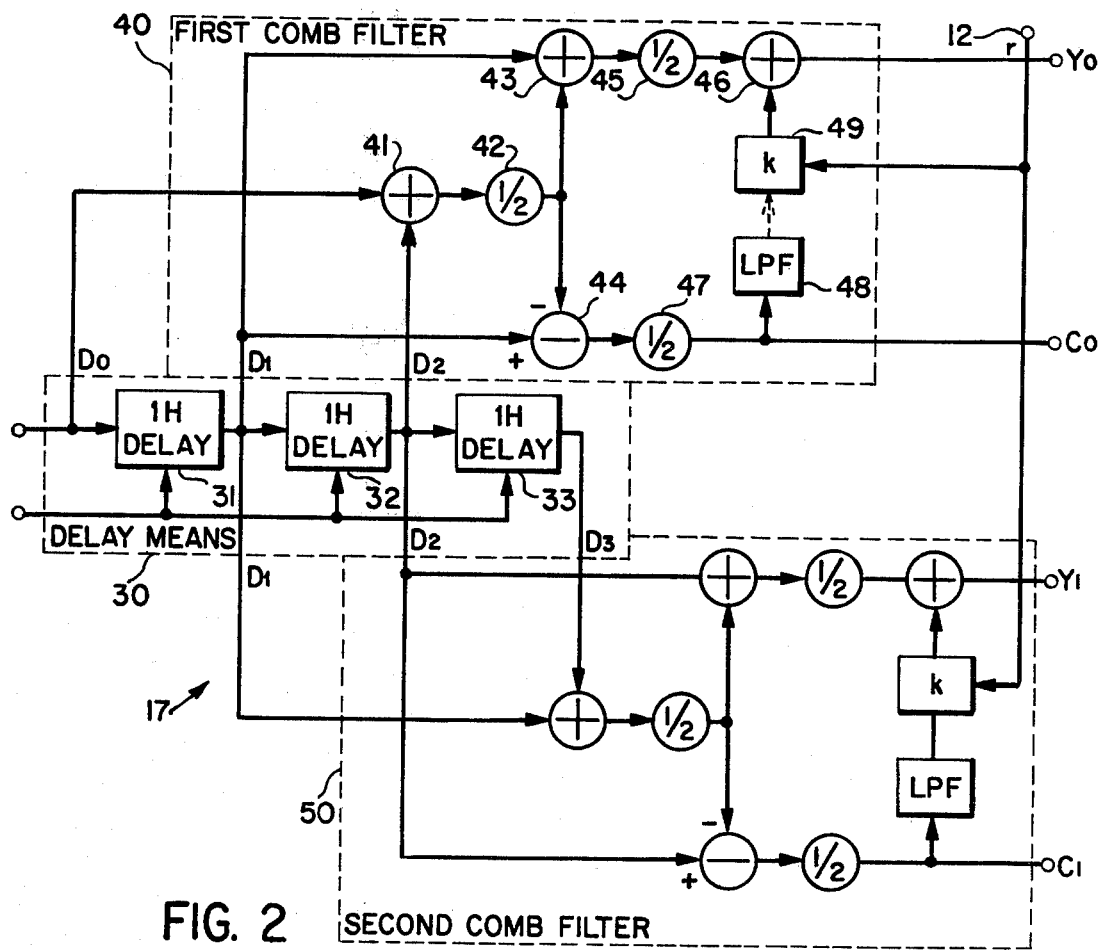
FIG. 2 is a block diagram of a Y/C separator used in the embodiment shown in FIG. 1.

Refer now to FIG. 2 for a description of the Y/C separator 17. As illustrated, the Y/C separator 17 comprises delay means 30, and first and second comb filters 40 and 50. The delay means is comprised of three 1H delay circuits 31, 32, and 33, connected in series, with each delay circuit having a delay time of 1H. Each of these delay circuits 31, 32, and 33 may comprise eight 910-stage shift registers with the clock pulse CP being supplied as a shift pulse. Alternatively, a memory device having a storage capacity extending at least to a 7280-bit interval may be employed. In the latter case, the clock pulse CP can be used both for the write-in and the read-out memory control signals. The delay means 30 provides 0H, 1H, 2H, and 3H delayed signals $D_0$, $D_1$, $D_2$, and $D_3$ respectively at the input and output of the delay circuit 31, and the outputs of the delay circuits 32 and 33, respectively.

The 0H, 1H, and 2H delayed signals $D_0$, $D_1$, and $D_2$ are supplied to the first comb filter 40 to provide one set of signals $Y_0$ and $C_0$. The 1H, 2H, and 3H delayed signals $D_1$, $D_2$, and $D_3$ are supplied to the second comb filter 50 to provide the other set of signals $Y_1$ and $C_1$.

The second comb filter 50 is identical to the first comb filter 40 in structure and operation.

In the first comb filter 40, the 0H and 1H delayed signals $D_0$ and $D_1$ are supplied to an adder 41 to provide a first added signal. The first added signal is supplied to an attenuator 42 for providing an output having an amplitude of one half of the input thereto. The attenuator output is then supplied to an adder and a subtractor 43 and 44 which are also supplied with the 1H delayed signal $D_1$ from the 1H delay circuit 31. A second added signal from the adder 43, i.e., a luminance signal component is supplied through an attenuator 45, identical to the attenuator 42, to an adder 46 for providing the Y signal $Y_0$.

In subtractor 44, the first added signal is subtracted from the 1H delayed signal to produce a subtracted signal, which is supplied to an attenuator 47 identical to the attenuator 42. The output of subtractor 47 is C signal $C_0$. The C signal $C_0$ is also supplied to a low pass filter 48 to extract a low frequency component from the C signal. The low-frequency component is supplied to a variable attenuator 49 whose transmission factor k is controlled by the compression ratio r. The output of the variable attenuator 49 is supplied to the adder 46 and added to the luminance signal component from attenuator 45 to compensate for the fluctuation in vertical contour.

The transmission factor k, for the variable attenuator 49, is divided into three values, i.e., 0, 0.5, and 1 in accordance with the ranges of the compression ratio r, i.e., $0\sim0.5$, $0.5\sim0.8$, and $0.8\sim1.0$, respectively. Stated more specifically, when the compression ratio r is in the range of 0 to 0.5, the transmission factor k is equal to 0, i.e., the low-frequency component is prevented from passing through the variable attenuator 49. When r=0.5 to 0.8, the transmission factor k is equal to 0.5, i.e., the amplitude of the low-frequency component is attenuated by one half. When r=0.8 to 1.0, the transmission factor k is equal to 1, i.e., the low-frequency component from the low-pass-filter 48 is supplied to the adder 46 without attenuation.

Figure 3A:
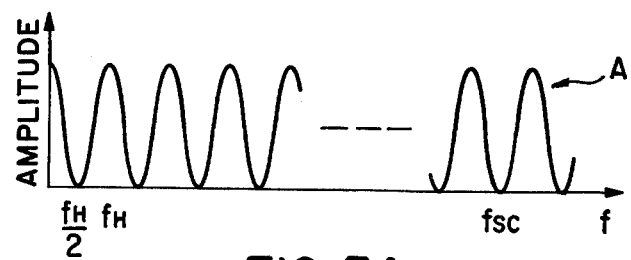
FIGS. 3A, 3B, and 3C are frequency vs. amplitude characteristics of signals appearing at various parts of the Y/C separator shown in FIG. 2.
Figure 3B:
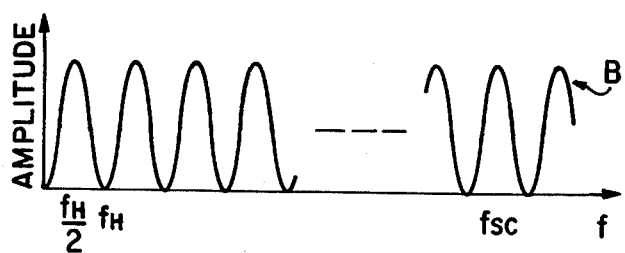
Figure 3C:
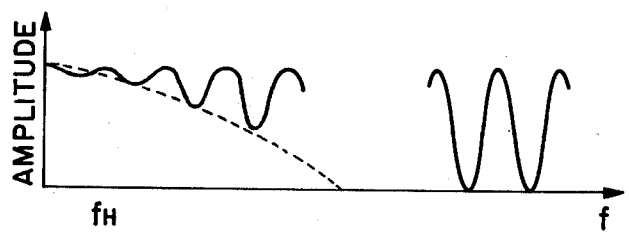

The Y and C signals from attenuators 45 and 47 have frequency vs. amplitude characteristics A and B as shown in FIGS. 3A and 3B, respectively, with characteristics A and B being 180° out of phase with to each other. In these characteristics, the peak-to-peak difference is equal to the horizontal scanning frequency fH. Conversely, the chrominance signal of the composite television signal includes very few low-frequency components. This means that the low-frequency components in the C signal, from attenuator 47, are not the chrominance signal component. In practice, however, the low-frequency components are useful for increasing vertical resolution. For this purpose, the low-frequency components are extracted from the C signal by the low-pass-filter 48 and added to the luminance signal component supplied from the attenuator 45 to produce the compensated Y signal $Y_0$ in its vertical contour, whose characteristic is shown in FIG. 3C.

Therefore it can be seen that the degree of addition of the low-frequency component, of the C signal $C_0$, to the luminance signal component depends upon the compression ratio r. This makes it possible to compensate for the fluctuation in vertical contour in accordance with the compression ratio r. This means that comb filter 40 has a spatial filtering effect.

The second comb filter 50 is identical to the first comb filter 40 except that the former is supplied with the 1H, 2H, and 3H delayed signals $D_1$, $D_2$, and $D_3$ instead of 0H, 1H, and 2H delayed signals. Therefore, the other set of Y and C signals $Y_1$ and $C_1$ obtained from the second comb filter 50 are behind the set of Y and C signals $Y_0$ and $C_0$ obtained from the first comb filter 40 by 1H.

Two sets of Y and C signals $Y_0$, $C_0$, $Y_1$ and $C_1$ are supplied to an interpolator 18 (FIG. 1), which is also supplied with the compression ratio data r from the terminal 12, the clock pulse CP from the clock pulse generator 16, and horizontal and vertical synchronizing signals H and V from the sync separator 15. The interpolator 18 performs vertical and horizontal interpolations for the compression in the vertical and horizontal directions in accordance with the compression ratio data r, and produces an interpolated PCM composite television signal TS, which is supplied to and stored in memory means 19, having a memory capacity of at least one field of the PCM composite color television signal. The interpolator 18 also produces a vertical write-in address control signal AC, which is supplied to an address signal generator 20. The write-in and read-out address signals generated by the address signal generator 20 are supplied to the memory means 19 and control the writing in and reading out of the PCM composite television signal.

Figure 4:
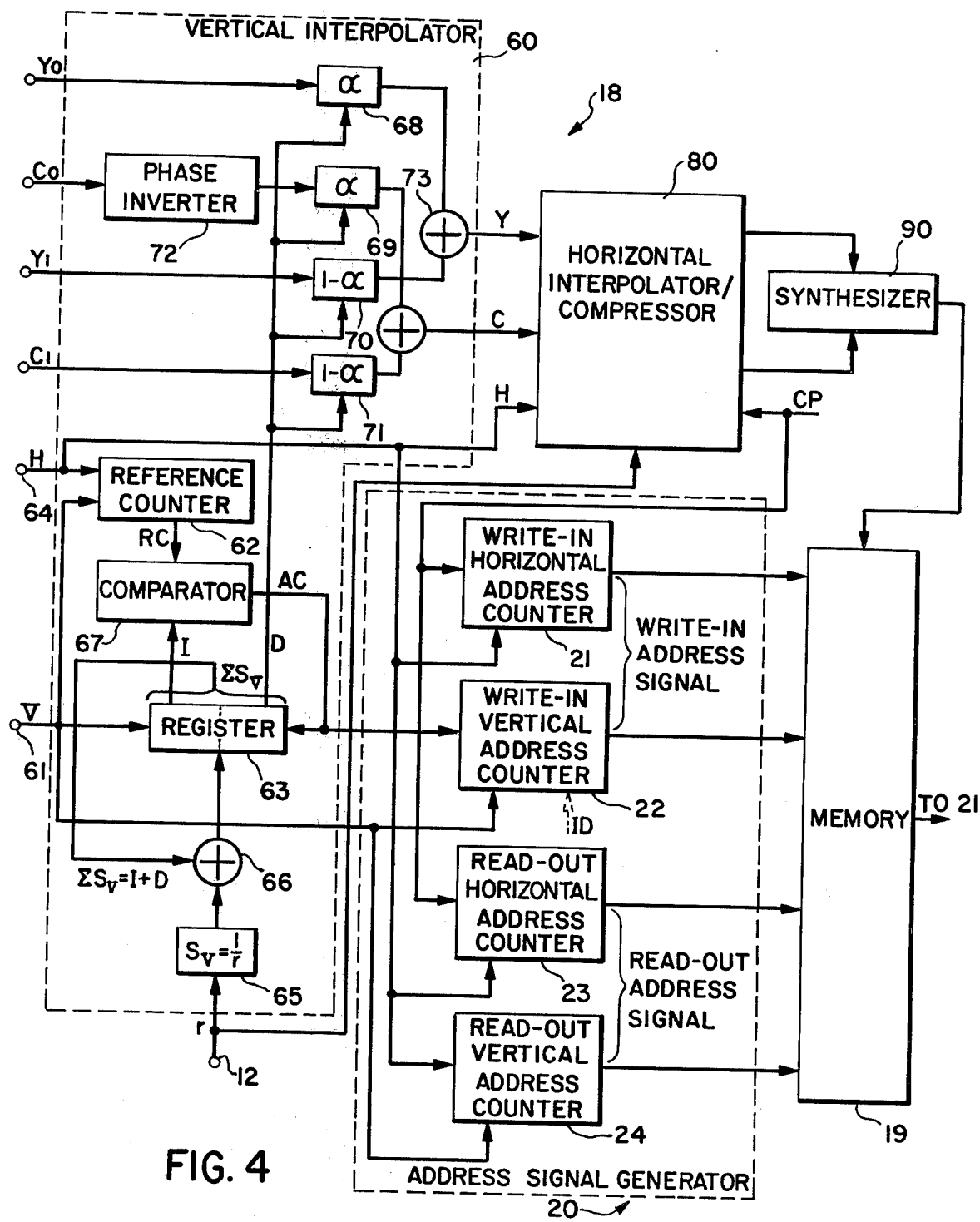
FIG. 4 is a block diagram of an interpolator and an address signal generator used in the embodiment shown in FIG. 1.

Refer now to FIG. 4 for a description of the interpolator 18 and the address signal generator 20. As illustrated, the interpolator 18 is composed of a vertical interpolator 60 for producing the vertically-interpolated Y and C signals, a horizontal interpolator/compressor 80 for producing horizontally-compressed Y and C signals, and a synthesizer 90 for synthesizing the Y and C signals to produce the PCM composite color television signal.

In the vertical interpolator 60, the vertical synchronizing signal V is supplied from a terminal 61 to reference counter 62 and register 63 to reset these devices. The reference counter 62 is supplied with the horizontal synchronizing signal H from a terminal 64 and counts this signal.

Figure 5H:
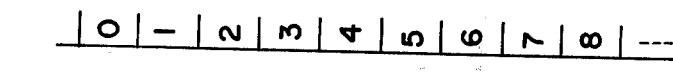
FIGS. 5A to 5H illustrate the operational principles of the interpolation and the compression.
Figure 5G:
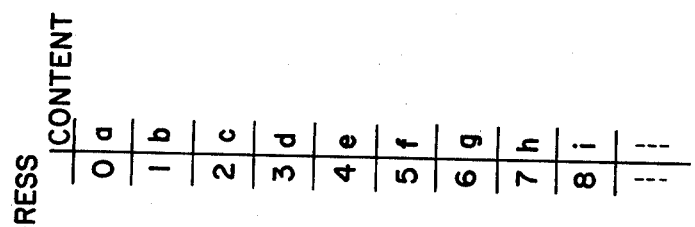
Figure 5F:
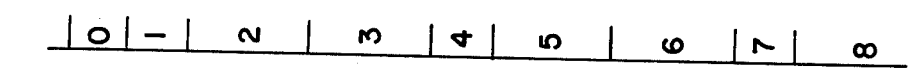
Figure 5E:
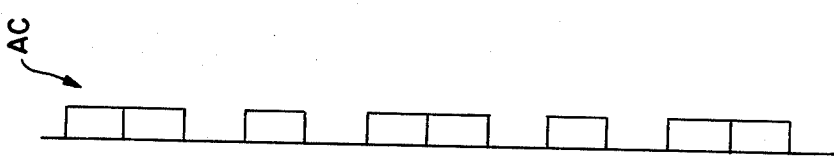
Figure 5D:
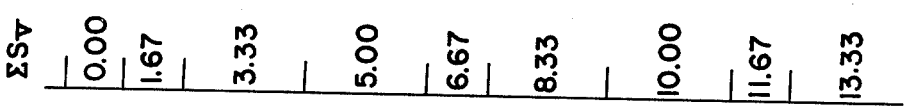
Figure 5C:
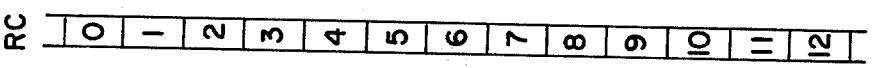
Figure 5B:
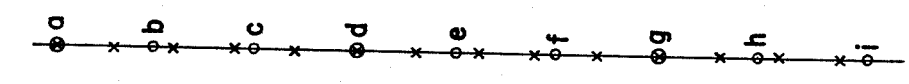
Figure 5A:
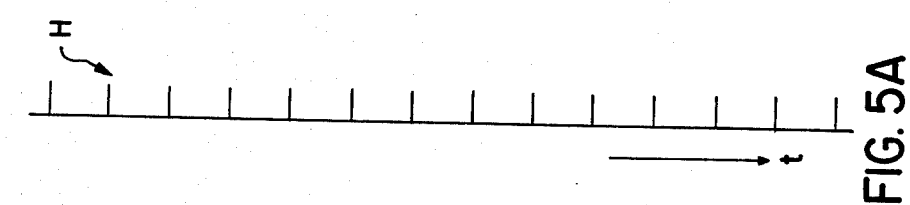

The compression ratio data r is supplied from the terminal 12 to a calculator 65 for calculating $S_V=1/r$ and for producing data $S_V$. Assuming that the compression ratio r is 0.6, i.e., the input picture size is compressed to three-fifths in both directions, the data $S_V$ is 1.67 (i.e. 1/0.6). This means that a new scanning line needs to be produced for every period equal to 1.67 times the period of the original scanning lines, as shown in FIG. 5, in which the ordinate stands for the lapse of time (t). In FIG. 5B, the symbols x stand for the original scanning lines appearing at the interval of the horizontal synchronizing signals H shown in FIG. 5A, and symbols ◯ (circles) stand for new scanning lines to be produced by the vertical interpolator 60.

The data $S_v$ is directed from calculator 65, through an adder 66 to the register 63, and registered therein. An integer I in the registered data $\Sigma S_v$ (FIG. 5D) is supplied to a comparator 67 and compared with the counted content RC (FIG. 5C) supplied from the reference counter 62. The comparator 67 generates pulses AC (FIG. 5E) every time the integer I and the counted content RC coincide with each other. The pulse AC is supplied to the register 63, whereby the registered data $\Sigma S_v$ is replaced with the data $\Sigma S_v + S_v$ supplied from the adder 66, which is supplied with the registered data $\Sigma S_v$ from the register 63 and the data $S_v$ from the calculator 65. Thus, the registered data $\Sigma S_v$ is increased by $S_v$ every time the integer I and the counted contents RC coincide with each other, i.e., every time the pulse AC is generated.

The decimal D in the registered data $\Sigma S_v$ is supplied as an interpolation factor $\alpha$ to variable attenuators 68, 69, 70, and 71, which are supplied with the signals $Y_0$, $C_0$, $Y_1$, and $C_1$ with the signal $C_0$ being phase-inverted by a phase inverter 72. The interpolation factor $\alpha$ (=D) is used for the transmission factors for the attenuators 68 and 69, and factor $1-\alpha(=1-D)$ for the attenuators 70 and 71. The outputs of the attenuators 68 and 70 are supplied to an adder 73 and added to each other to produce the vertically interpolated Y signal. The outputs of the attenuators 69 and 71 are added to each other by an adder 74 to produce the vertically interpolated C signal.

The vertically interpolated Y and C signals are supplied to the horizontal interpolator/compressor 80 to produce the horizontally compressed Y and C signals. The horizontally compressed Y and C signals are synthesized by the synthesizer 90 to produce the horizontally compressed PCM composite color television signal, which is then stored in the memory means 19 (FIG. 1) under the control of the write-in address signals from the address signal generator 20.

The address signal generator 20 comprises, as shown in FIG. 4, a write-in horizontal address counter 21, which is supplied with the clock pulse CP as the clocking pulse and the horizontal synchronizing signal H as the reset pulse. Address counter 21 produces the write-in horizontal address signal. A write-in vertical address counter 22 is supplied with the pulse AC, from the comparator 67 in the vertical interpolator 60, as the clocking pulse to produce the write-in vertical address signal as shown in FIG. 5F. The write-in horizontal and vertical address signals are supplied to memory means 19 and control the write-in of the PCM composite color television signal from the interpolator 18.

As understood from FIG. 5, the vertically interpolated Y and C signals are produced and stored in memory means 19 even when the pulse AC is not generated. However, these signals are cancelled by writing in the proper signals at the same addresses. Thus, the vertically interpolated signals, at only the points a, b, c . . . indicated by the symbol "circle" in FIG. 5B, are stored in memory means 19. This is shown in FIG. 5G in which the left column stands for the memory addresses and the right column for the memory contents a, b, c, . . . representing the contents at the points a, b, c, . . . in FIG. 5B. In other words, the vertically interpolated signals are stored in the memory means 19 in a compressed fashion.

The write-in vertical address counter 22 is also supplied with the vertical synchronizing signal V as the reset pulse, and an initial data ID. The initial data ID is used for deciding the start address from which the write-in of the interpolated signals in the vertical direction is started. This means that the position of the compressed picture on the display tube can be changed by the initial data ID.

The address signal generator 20 also comprises a read-out horizontal address counter 23, identical to the write-in horizontal address counter 21, and a read-out vertical address counter 24 which is supplied with the horizontal synchronizing signal H as the clocking pulse and the vertical synchronizing signal V as the reset pulse. Address counter 24 produces the read-out vertical address signal as shown in FIG. 5H. Because the read-out horizontal and vertical address signals are supplied to the memory means 19 and control the read-out of the stored signals, the PCM composite color television signal, compressed in accordance with the compression ratio r, can be read-out from memory means 19.

The read out PCM composite color television signal is supplied to a D/A converter 21, which is supplied with the clock pulse CP from the clock pulse generator 16. The D/A converter 21 converts the PCM composite color television signal into a compressed analogue composite color television signal representing the compressed picture.

The horizontal interpolator/compressor 80 is identical to the combination of the vertical interpolator 60 and the memory means 19 except that the clock pulse CP and the horizontal synchronizing signal H are used instead of the horizontal synchronizing signal H and the vertical synchronizing signal V, respectively. In addition a memory, having a capacity of 1H, is used for horizontal compression instead of the field- or frame-memory 19. The interpolations for Y and C signals are achieved between the adjacent samples and between the samples having the same phase, respectively. The horizontal compressor shown in the above-mentioned U.S. Pat. No. 4,063,280 may be used in place of the horizontal interpolator/compressor 80.

Although a specific embodiment of this invention has been shown and described, it will be understood that various modifications may be made without departing from the spirit of this invention.

What is claimed is:

1. A luminance/chrominance separating apparatus for a composite color television signal including a luminance signal and carrier chrominance signal, said carrier chrominance signal being formed by modulating a subcarrier wave with chrominance information, the subcarrier frequency of said subcarrier wave being m/2 (m being an odd number) of the horizontal scanning frequency of said composite color television signal, said separating apparatus comprising:

first and second series connected delay means for respectively providing a delay for said composite color television signal, the delay time of each of said first and second delay means being equal to one horizontal scanning period of said composite color television signal, said first and second delay means producing first and second delayed signals, respectively;

means for applying said composite color television signal to an input of said first delay means as a non-delayed signal;

first adding means for adding said non-delayed signal to said second delayed signal to produce a first added signal;

second adding means for adding said first delayed signal to said first added signal to produce a second added signal;

means for subtracting said first added signal from said first delayed signal to produce a subtracted signal;

means for extracting a low frequency signal component from said subtracted signal;

variable attenuator means for attenuating said low-frequency signal component; and third adding means for adding an output signal of said variable attenuator to said second added signal.

2. A luminance/chrominance separating apparatus in accordance with claim 1 wherein there is further included third delay means for providing additional delay to said composite color television signal, said additional delay being equal to one horizontal scanning period, said third delay means producing a third delayed signal.

3. A luminance/chrominance separating apparatus in accordance with claim 2 wherein there is further included fourth adding means for adding said first delayed signal to said third delayed signal to produce a third added signal.

4. A luminance/chrominance separating apparatus in accordance with claim 3 wherein there is further included fifth adding means for adding said second delayed signal to said third added signal to produce a fourth added signal and second means for subtracting said third added signal from said second delayed signal to produce a second subtracted signal.

5. A luminance/chrominance separating apparatus in accordance with claim 4 wherein there is further included means for extracting a second low frequency signal component from said second subtracted signal, second variable attenuator means for attenuating said second low-frequency component and sixth adding means for adding an output signal from said second variable attenuator means to said fourth added signal.

6. A luminance/chrominance separating apparatus in accordance with claim 1 wherein there is further included fixed attenuating apparatus for attenuating by one-half said first added signal, said second added signal and said subtracted signal.

* * * * *